Patented Jan. 9, 1951

2,537,642

UNITED STATES PATENT OFFICE 2,537,642

HIGH SOLIDS SYNTHETIC RUBBER LATEX

Robert L. Bebb, Akron, Ohio, assignor to The Firestone Tire & Rubber Company, Akron, Ohio, a corporation of Ohio No Drawing. Application August 8, 1947, Serial No. 767,649

3 Claims. (Cl. 260—83.7)

This invention relates to the manufacture of synthetic rubber latices of high solids content.

Heretofore, in the commercial manufacture of synthetic rubber by the emulsion copolymerization of 1,3-butadiene and styrene, the concentration of the hydrocarbon monomers in the polymerization reaction mixture has been held below about 40 per cent, and usually below about 36 per cent, in order to produce a fluid latex, sufficiently "thin" for ready handling. An initial charge of about 36 per cent monomers produced a latex which was rather "thick," and a charge of about 40 per cent produced a latex which was too thick for ordinary factory operations. Moreover, these thick latices had a tendency to flocculate, so that they were unsuitable for latex applications requiring a mechanically stable latex.

Before World War II concentrated natural rubber latex was readily available with total solids of 60–62 per cent and having excellent mechanical stability. When war conditions made natural latex unavailable, there arose a demand for synthetic rubber latices of similar low water content.

It is therefore an object of this invention to provide synthetic rubber latices of high solids content and possessing viscosities sufficiently low to make them suitable for replacing concentrated natural latex. Another object is to provide an improved method of copolymerizing butadiene and styrene to produce a mechanically stable, high solids latex of low viscosity. Other objects will be apparent in the description of the invention which follows.

The objects of the invention are realized by making use of a special three-component emulsifying system, which allows the monomer charge of the polymerization emulsion to be increased to 48 per cent and higher without reducing the fluidity and stability of the latex, as compared with a commercial butadiene-styrene latex polymerized in the presence of the usual single emulsifier. The combination of emulsifiers giving this improved result is:

(1) A soap of a fatty acid,
(2) A sodium phosphate, and
(3) A water soluble salt of a condensed naphthalene sulfonic acid.

Ordinary soaps, as commercially employed in synthetic rubber emulsion polymerizations may be used. Also sodium oleate and sodium stearate give good results.

Disodium phosphate and sodium pyrophosphate have been successfully employed, although other sodium phosphates may also be utilized.

The commercial product known as Daxad 11 or Darvan No. 1 has been used as the water soluble salt of a condensed naphthalene sulfonic acid, and it is understood that this product is the sodium salt of beta-naphthalene sulfonic acid condensed with formaldehyde. Other water soluble salts, notably the potassium and ammonium salts, and the free acid as well, are useful, but the sodium salt is preferred because of its commercial availability.

The invention is specifically disclosed in the following example, in which all parts are by weight.

EXAMPLE

A 24 ounce pressure bottle was loaded with a solution of emulsifying agents, the catalyst and the styrene containing the modifier dissolved therein. The required amount of butadiene was weighed in, and the bottle was immediately closed with a tin-lined cap. The above-mentioned ingredients were in accordance with Formula 1.

Formula 1

| Materials: | Parts |
|---|---|
| Butadiene | 75.0 |
| Styrene | 25.0 |
| Water | 108.0 |
| Sodium oleate | 2.9 |
| Dodecyl mercaptan (modifier) | 0.5 |
| Potassium persulfate (catalyst) | 0.3 |
| Disodium phosphate | 1.0 |
| Sodium salt of the formaldehyde condensation product of beta-naphthalene sulfonic acid | 1.0 |

The above formula represents a monomer loading of 47 per cent. The loaded and sealed bottle was shaken in a water bath at 48–50° C. for 18 hours to polymerize the monomers. At the end of the polymerization cycle the bottle was cooled and opened. The latex was stabilized by the addition of 2 per cent of phenyl-beta-naphthylamine (based upon the combined monomers charged) as a water dispersion. The latex was observed to be thin, very free-flowing, and stable. In order to determine the conversion, the latex was coagulated with a dilute solution of aluminum sulfate, the coagulum was washed on a mill, dried in an oven at 70° C. and then weighed. The conversion in this test was 88.5 per cent.

Further experimentation has indicated that sodium stearate produces substantially higher conversions when substituted for sodium oleate in Formula 1. Also, the soap may be increased to 4 or 5 parts with good results. Indications were that tetrasodium pyrophosphate increased the mechanical stability of the latex slightly when it was substituted for the disodium phosphate. The naphthalene sulfonic acid emulsifier may be employed in concentrations as low as 0.25 per cent per 100 parts of combined monomers, and may be used at higher concentrations, up to 2 or 3 per cent, although experimental work indicated an optimum range of about 0.5 to 1.5 per cent.

Formula 2 is given as a preferred formula, based upon the experimental work of applicant (patentee).

*Formula 2*

| Material: | Parts |
|---|---|
| Butadiene | 75 |
| Styrene | 25 |
| Water | 82 |
| Soap (sodium oleate or stearate) | 4 |
| Potassium persulfate | 0.5 |
| Dodecyl mercaptan | 0.5 |
| $Na_2HPO_4$ | 2 |
| Sodium salt of the formaldehyde condensation product of beta-naphthalene sulfonic acid | 1 |
| | 190.0 |

Formula 2 provides a monomer loading of about 53 per cent. A batch in accordance therewith polymerizes to 85–90 per cent conversion, and the resulting latex contains a total solids of 50–55 per cent, and is of suitable low viscosity for successful use in latex applications.

An additional step may be employed to raise the total solids of the latex of the invention further. During removal of unreacted monomers by stripping, the latex may be gently heated, and exposed to a vacuum, if desired, to remove some water with the unreacted styrene. This step raises the total solids of the latex as much as about 10 per cent. Even though the resulting latex contains as much as about 60 per cent total solids, it is sufficiently fluid for useful latex applications.

Other modifiers and oxidizing catalysts than the specific examples set out in the formulas may be substituted therefor, and minor changes in proportions made, as will be readily understood. Also, it is intended to include the use of activated polymerization formulas as equivalent to the standard butadiene-styrene formulas specifically disclosed. Faster polymerizations and higher conversions are more readily obtained thereby, especially by use of redox systems.

The invention is defined in the appended claims.

What is claimed is:

1. Method of making a high solids synthetic rubber latex, which includes forming an emulsion of monomers butadiene and styrene in water in the ratio of 100 parts of the monomers to 82 to 108 parts of water by means of a three-component emulsifying agent consisting of (1) 2.9 to 5 parts of soap selected from the group consisting of sodium oleate and sodium stearate, (2) 1 to 2 parts of a sodium phosphate and (3) 0.25 to 3 parts of a water soluble salt of a condensed naphthalene sulfonic acid, and polymerizing the emulsion.

2. Method of making a high solids synthetic rubber latex, which includes forming an emulsion of 75 parts of butadiene, 25 parts of styrene and 82 parts of water by means of a three-component emulsifying agent consisting of (1) 4 parts of soap selected from the group consisting of sodium oleate and sodium stearate, (2) 2 parts of a sodium phosphate and (3) 0.5 to 1.5 parts of a water soluble salt of a condensed naphthalene sulfonic acid, and polymerizing the emulsion.

3. Method of making a high solids synthetic rubber latex, which includes forming an emulsion of monomers butadiene and styrene in water in the ratio of 100 parts of the monomers to 82 to 108 parts of water by means of a three-component emulsifying agent consisting of (1) 2.9 to 5 parts of soap selected from the group consisting of sodium oleate and sodium stearate, (2) 1 to 2 parts of a sodium phosphate and (3) 0.25 to 3 parts of a water soluble salt of a condensed naphthalene sulfonic acid, polymerizing the emulsion, and distilling water from the polymerized latex while maintaining the latex in a fluid condition.

ROBERT L. BEBB.

REFERENCES CITED

The following references are of record in the file of this patent:

UNITED STATES PATENTS

| Number | Name | Date |
|---|---|---|
| 1,864,078 | Luther et al. | June 21, 1932 |
| 2,366,326 | Fryling | Jan. 2, 1945 |
| 2,375,140 | Semon | May 1, 1945 |
| 2,392,756 | Mighton | Jan. 8, 1946 |
| 2,418,782 | Mark et al. | Apr. 8, 1947 |
| 2,423,766 | Freeman | July 8, 1947 |